United States Patent [19]

Howlett

[11] 4,239,246
[45] Dec. 16, 1980

[54] RIGID CHUCK ASSEMBLY

[76] Inventor: James W. Howlett, 746 Folger Ave., Berkeley, Calif. 94710

[21] Appl. No.: 972,273

[22] Filed: Dec. 22, 1978

[51] Int. Cl.³ .............................................. B23B 31/10
[52] U.S. Cl. ..................................... 279/121; 279/123
[58] Field of Search .................... 279/121, 123, 70, 74, 279/1 ME; 269/217, 234, 321 W

[56] References Cited

U.S. PATENT DOCUMENTS

| | | | |
|---|---|---|---|
| 2,676,381 | 4/1954 | Holmes | 279/123 |
| 3,100,382 | 8/1963 | Müller | 279/121 X |
| 3,253,332 | 5/1966 | Howlett | 403/305 |
| 3,415,552 | 12/1968 | Howlett | 403/305 |
| 3,434,337 | 3/1969 | Goeke | 279/121 X |
| 3,456,956 | 7/1969 | Herbkersman | 279/121 X |
| 3,792,869 | 2/1974 | Braun | 279/121 X |
| 3,850,535 | 11/1974 | Howlett | 403/305 |
| 3,999,418 | 12/1976 | Morell | 279/123 X |

FOREIGN PATENT DOCUMENTS

| | | | |
|---|---|---|---|
| 1034307 | 7/1978 | Canada | 403/305 |
| 723886 | 2/1955 | United Kingdom | 279/121 |
| 417248 | 10/1974 | U.S.S.R. | 279/1 ME |

*Primary Examiner*—William R. Briggs
*Attorney, Agent, or Firm*—Warren, Chickering & Grunewald

[57] ABSTRACT

A chuck assembly for rigidly gripping an elongated workpiece, and particularly concrete reinforcing bars, is disclosed. The chuck assembly is designed for use in a machine tool, such as a thread mill, to enable threading of the ends of reinforcing bars. The chuck assembly includes jaws that are formed to engage the bar over a substantial length, preferably at least four bar diameters, and that are formed to provide a line contact engagement of the bar so as to dig into the bar ribs and provide high resistance to torsional forces. The jaw members are preferably tapered and actuated by a pair of complimentary wedge members mounted in sliding engagement with substantially the entire length of the jaw members. The chuck assembly is mounted in a two piece cast housing that is bolted together and formed with openings to permit debris to gravitate from the movable members of the assembly.

7 Claims, 6 Drawing Figures

RIGID CHUCK ASSEMBLY

BACKGROUND OF THE INVENTION

The use of mechanical coupling sleeves to join concrete reinforcing bars together in end-to-end relation is well known. A constant problem in connection with such mechanical couplers is the fact that the reinforcing bars are ribbed or formed with protrusions that can interfere with the coupler operation.

One approach to the mechanical coupling of reinforcing bars is shown in my U.S. Pat. No. 3,253,332 in which the bar ends are gripped by convergently acting wedges. This approach requires that the ribs on the bar ends be removed to enable the wedges to securely grip the bar ends. A second approach to mechanical coupling is set forth in U.S. Pat. No. 3,415,552 in which a threaded tapered connecting section is formed on the end of the reinforcing bar, including the ribs of the bar. The formation of a tapered thread on the end of a reinforcing bar can be accomplished by means of a number of conventional machine tools, but can probably most easily be accomplished by means of a thread mill and a multiple ring cutter.

Typically, reinforcing bars ranging from about 1 to about 2½ inches in diameter and having a length of about 20 to 30 feet, or more, will be threaded with a tapered thread at one or both ends by means of a thread mill. It has been found, however, that unless the thread mill is extremely large, problems sometimes occur in connection with gripping the ribbed reinforcing bars. These problems are complicated by the fact that the ribbed reinforcing bar is often made to rather crude specifications and may, for example, be irregularly formed or deformed in the area which must be gripped during the threading process. Thus, the combination of bar irregularity and ribs makes it difficult to grip concrete reinforcing bars with enough rigidity to ensure the formation of accurate tapered threads. Thus, the conventional chuck assemblies, such as collet-type or pivotal jaws are inadequate for the job or rigidly gripping a concrete reinforcing bar, with its ribs or protrusions and inherent inaccuracies of manufacture, unless the chuck assembly is massively oversized.

The thread mill threading process which is preferred for the formation of tapered threads on reinforcing bars is described in more detail in my Canadian Pat. No. 1,034,307, and a union for the tapered threaded reinforcing bar is set forth in my U.S. Pat. No. 3,850,535.

OBJECTS AND SUMMARY OF INVENTION

Objects of the Invention

Accordingly, it is an object of the present invention to provide a chuck assembly for a machine tool or the like which enables extremely rigid and secure gripping of elongated workpieces and particularly ribbed reinforcing bars.

It is another object of the present invention to provide a chuck assembly for a machine tool or the like which is relatively inexpensive to construct, may be readily adapted for use with a wide range of machine tools, and is easy and trouble free to operate.

It is a further object of the present invention to provide a chuck assembly for a machine tool or the like in which debris is free to gravitate from the moving parts and maintenance of the chuck assembly is simplified.

Another object of the present invention is to provide a chuck assembly suitable for rigid and high strength gripping of a ribbed reinforcing bar so that the end of the bar may be threaded.

The chuck assembly of the present invention has other objects and features of advantage which will be set forth in more detail in the following description of the preferred embodiment and which will be apparent from the accompanying drawing.

Summary of the Invention

The chuck assembly of the present invention is designed for rigid gripping of an elongated workpiece, and particularly a ribbed reinforcing bar, while the workpiece is mounted in a machine tool, such as a thread mill. The chuck assembly is comprised, briefly, of jaw means having a first side formed to engage the reinforcing bar or workpiece over a substantial length thereof, preferably at least four diameters of the workpiece. The jaw means further includes a second oppositely facing side formed with an elongated surface having a length equal to the first side, and the jaw means is mounted to the chuck assembly for reciprocation toward and away from the workpiece. Additionally, the chuck assembly includes wedge means mounted to the assembly for reciprocation in a direction along the workpiece, with the wedge means including an elongated surface in sliding engagement with the surface on the jaw means. The wedge means is mounted to urge the jaw means towards the workpiece and generate lateral gripping forces while supporting the entire length of the jaw means on the wedge surface. In the preferred form, the jaw includes a removable workpiece engaging element formed with laterally spaced apart, longitudinally extending shoulders that contact the reinforcing bar along relatively thin lines over a length of the bar, typically about five to about ten bar diameters. These shoulders enable localized deformation of the reinforcing bar, and particularly the ribs, by the jaws for high strength bar gripping and resistance to torsional loading, as is produced, for example, by threading of the reinforcing bar.

DESCRIPTION OF THE PREFERRED EMBODIMENT

The chuck assembly of the present invention can be mounted to a wide range of machine tools, but it may be particularly advantageous used in connection with thread mills (horizontal rotary milling machines). Although not shown in detail in the present drawing for simplicity of illustration, a thread mill will commonly include a chuck assembly that is relatively slowly rotated (one revolution per thirty minutes to ten revolutions per minute) so that the workpiece is rotated slowly while a high speed rotary cutting tool performs a machining operation on the workpiece. Thus, the thread mill includes the slow chuck assembly and a high speed cutter. The use of thread mills is widespread in connection with the manufacture of drill rods of the type used in oil well drilling. Thread mills are also used for numerous specialized milling operations, such as breach rings on cannons and artillery pieces, or in a variety of other applications where grooves and the like are to be milled into rods, tubes and bars.

The use of a thread mill to form a tapered thread on a piece of reinforcing bar is particularly advantageous. A multiple ring cutter can be mounted on the high speed cutting head with the reinforcing bar mounted in the thread mill chuck. One slow speed turn of the chuck, while the high speed ring cutter is milling the bar end and is advanced gradually during the milling operation, will produce a continuous tapered thread on the end of the reinforcing bar.

While extremely large thread mills having a conventional chuck assembly are capable of reproducibly performing this operation with satisfactory accuracy, such machines are unnecessarily large over designed and excessively costly for the project to be undertaken. When smaller thread mills are employed, however, problems are encountered with gripping the uneven ribbed reinforcing bar in that the chuck assembly is simply not rigid enough to hold the reinforcing bar securely during the thread cutting operation. The chuck assembly of the present invention, however, is constructed in a manner in which will enable even relatively small thread mills to be employed in forming tapered threads on ribbed reinforcing bars as large as 2½ inches in diameter.

Figure 2:
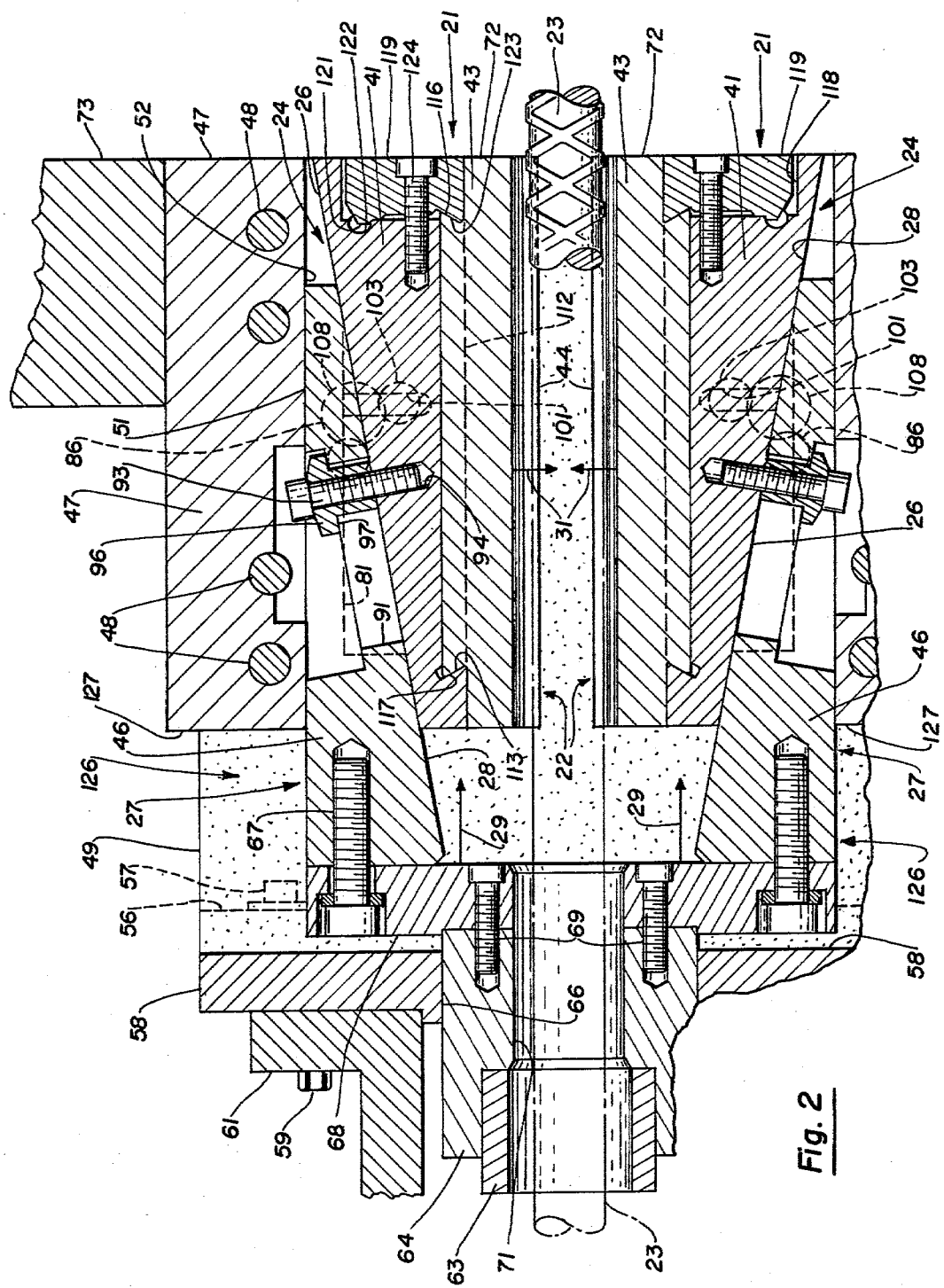
FIG. 2 is an enlarged, fragmentary, cross-sectional view taken substantially along the plane of line 2—2 of FIG. 1.

As best may be seen in FIG. 2, the chuck assembly of the present invention includes a workpiece engaging jaw means 21 having a first side, generally designated 22, formed to engage workpiece or reinforcing bar 23, and an oppositely facing second side 24, formed with an elongated surface 26. Surface 26 extends over a length at least about equal to the length of first side 22 which engages reinforcing bar 23. Additionally, the chuck assembly includes wedge means, generally designated 27, including an elongated surface 28 mounted in sliding engagement with and having a length at least about equal to surface 26 on jaw means 21. Wedge means 27 is mounted for guided reciprocation in a direction along reinforcing bar 23, as indicated by arrows 29, while jaw means 21 is mounted for guided reciprocation toward the reinforcing bar, as indicated by arrows 31, and in the reverse direction, as will be set forth in more detail hereinafter.

In operation, wedge means 27 is advanced in a direction of arrows 29 so that surface 28 bears against surface 26 and urges jaw means 21 toward workpiece or reinforcing bar 23.

Thus, the wedging action between wedge means 27 and jaw means 21 generates lateral gripping forces in jaw means 21, which forces extend uniformly over a substantial length of the reinforcing bar. Preferably, first side 22 of jaw means 21 engages reinforcing bar 23 over a length equal to at least about four diameters of the reinforcing bar, and more typically, a length in the range of about five to about ten bar diameters. It has been found that the uniform, high strength gripping resulting from the chuck assembly of the present invention will actually straighten out a bent or deformed end of the reinforcing bar over the gripping length of the chuck jaws.

Having generally described the chuck assembly of the present invention, some further details of its construction and additional features of its operation can be set forth. As will be seen, it is preferable for jaw means 21 of the chuck assembly of the present invention to be comprised of a pair of movable jaw members 41 that reciprocate toward each other and have surfaces 26 that are tapered so as to act as wedging surfaces complimentary with surfaces 28 on wedge means 27. Preferably both surfaces are tapered at about 10° angles. Removably mounted to each jaw member 41 is a workpiece engaging element 43 that can be seen in FIGS. 1 and 5 to have a generally U-shaped cross section. A pair of laterally spaced apart, longitudinally extending shoulders 44 are provided on element 43, which shoulders engage the reinforcing bar and deform the ribs of the same over the length of the jaw.

Figure 1:
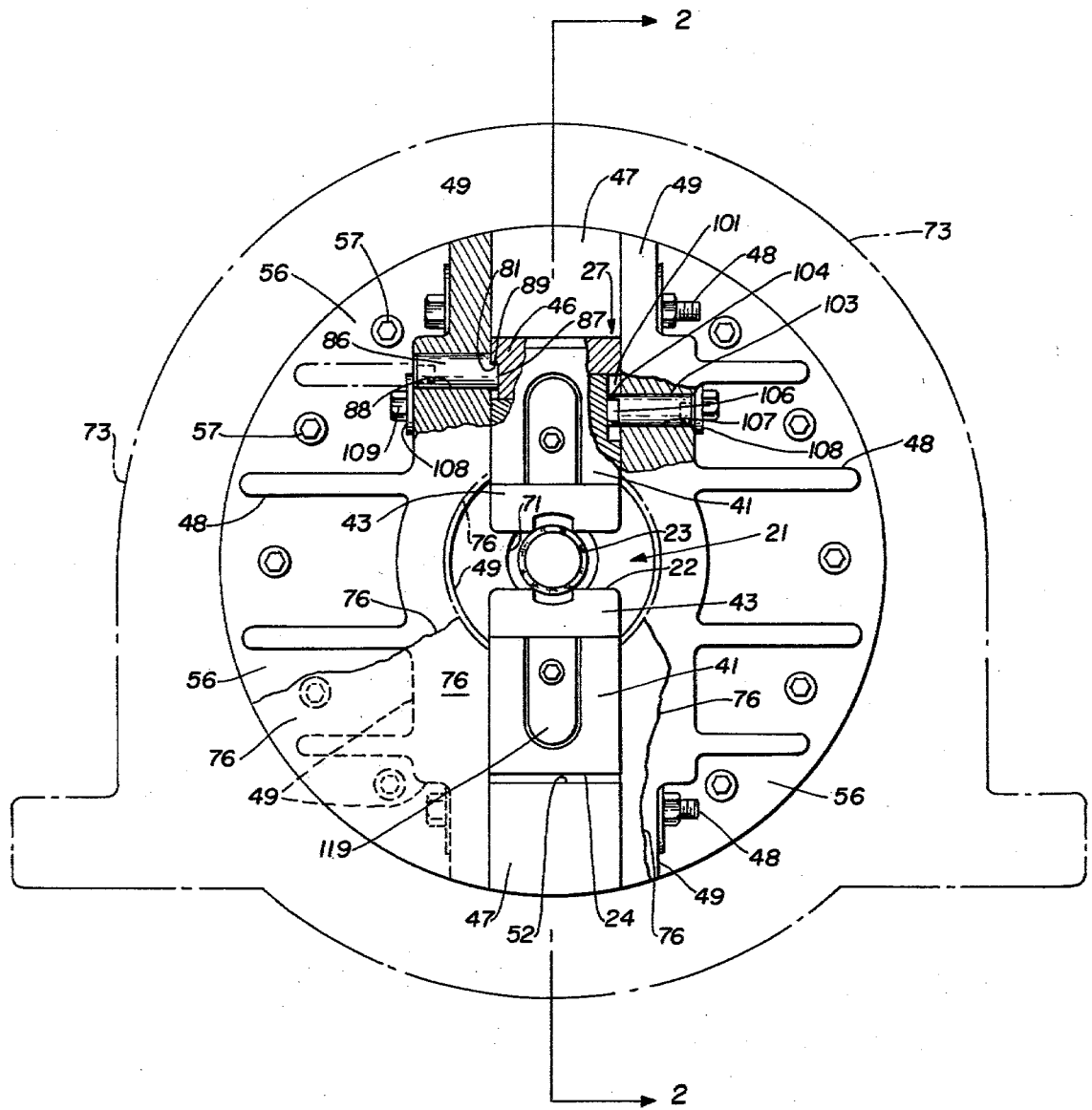
FIG. 1 is a front elevational view, partially broken away, of a chuck assembly constructed in accordance with the present invention.

In a similar fashion, wedge means 27 is preferably formed as a pair of wedge members 46 that are mounted in sliding engagement with wedge members 41, and the chuck assembly further preferably includes containment means in the form of an element or member 47 that is bolted by means of fasteners 48 to two castings members or halves 49 (best seen in FIG. 1). Thus, the wedge members 46 have an outwardly facing surface 51 that is in sliding engagement with an inwardly facing surface 52 of containment element 47 for support of the jaw actuating wedge members 46. As will be seen, it is preferable for the surface 52 to have a length about equal to the length of wedges 46 and jaws 21. It is also contemplated that surfaces 26 and 28 can be horizontal, while surfaces 51 and 52 are complimentary and tapered to produce the necessary wedging action and lateral displacement of jaw mean 21.

In order to mount the chuck assembly of the present invention to the thread mill, it is preferable for casting members 49 to be formed with a flange 56 which can be bolted by means of fasteners 57 to adapter plate 58. The adapter plate, in turn, can be formed so as to enable mounting by bolts or the like 59 to the flange 61, comprising the slowly rotated spindle portion of the thread mill.

Mounted for axial reciprocation inside rotatable spindle 61 is chuck mounting element 64 and band 63. Thus, adapter plate 58 is bolted to spindle 61 for rotation of the entire chuck assembly with the spindle, and yet adapter plate 58 is formed with a central opening 66 through which the chuck mounting element 64 is mounted for sliding axial reciprocation.

In order to provide actuation of jaws 21, the wedge members can be mounted by fasteners 67 to a second adapter plate 68, which in turn is mounted by fasteners 69 to axially reciprocal chuck mounting element 64. As will be seen best in FIG. 2, band element 63 chuck mounting element 64 and adapter plate 68 all are formed with a central bore 71 dimensioned for receipt of reinforcing bar 23, and in fact, the reinforcing bar 23 extends axially through the entire thread mill. Typically, reinforcing bars 23 will have a length on the order of about twenty to thirty feet, although shorter or longer bars can be threaded. Since only about six to twelve inches will extend outwardly of the front face 72 of the chuck assembly, the remainder of the bar must extend rearwardly through the thread milling machine.

In addition to merely bolting the chuck assembly to spindle 61, it is preferable to provide the chuck assembly with a steady rest 73 (shown in phantom in FIG. 1). The steady rest includes support portions 74 that can be mounted in sliding engagement on the thread mill bed, and it is preferable to provide additional rigidity and lateral support for the chuck assembly by providing a plate 76 (shown broken away in FIG. 1) which fills the space between chuck jaws 21 and steady rest 73 at the front end of casting halves 49. Plates 76 are generally D-shaped and provide lateral support for the chuck assembly in the steady rest.

Figure 3:
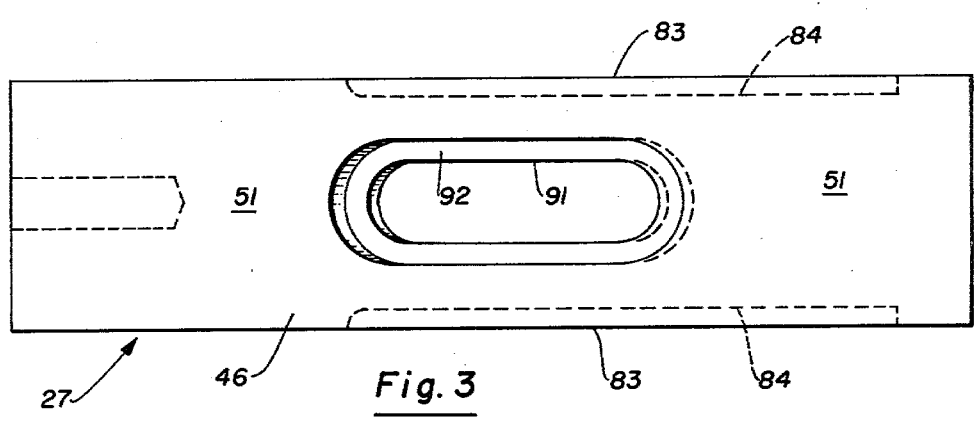
FIG. 3 is an enlarged, top plan view of the outer wedge member of FIG. 2.
Figure 4:
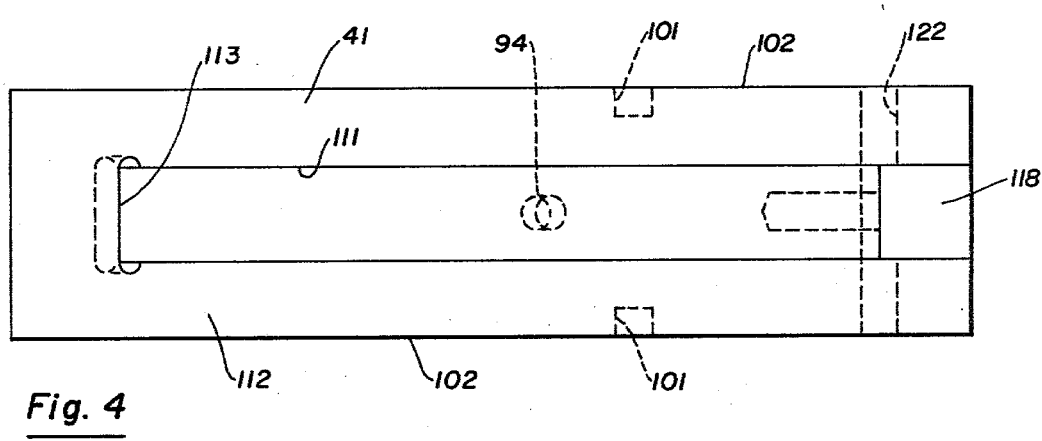
FIG. 4 is an enlarged, bottom plan view of the inner jaw member of the chuck assembly of FIG. 2.

Although the mounting of wedge members 46 to adapter plate 68 will tend to maintain the wedge members for movement in a horizontal or longitudinal direction, wedge 46 is further preferably formed to ensure guided horizontal movement by keying the same for such movement with respect to casting halves 49. This is accomplished by providing longitudinally extending, horizontal surfaces 81 (FIGS. 1 and 2) in sides 83 (FIG. 3) of wedge member 46. Surface 81 is provided by milling to a depth in sides 83 of the wedge members. A pin 86, having a protruding end 87, is driven into an opening 88 in each of casting halves 49 until end 87 of the pins extend into the milled out portion of the side walls of wedge member 46. The protrusions 87 of pins 86 are provided with flat surfaces 89 that slidably engages surface 81 so as to cooperate with interengaged surfaces 51 and 52 to maintain the movement of wedge 46 in a horizontal plane.

Additionally, in order to maintain sliding engagement of wedge member 46 with complimentary portion 41 of jaw means 21, and further in order to retract jaw means 21 upon retraction of wedge means 27, it is preferable to provide a longitudinally extending slot 91 in each wedge member 46, which slot is surrounded by a surface 92 that is generally parallel to surface 28. Mounted to extend through slot 91 is a fastener or bolt 93 that is threadably engaged in threaded bore 94 and jaw member 41. Surrounding bolt 93 is a washer element 96 having flange surface 97 that slidably engages surface 92 surrounding slot 91 in the wedge member. Bolt 93 is not pulled down so as to bind the wedge members together, but instead merely holds the same so that the bolt and washer will slide along surface 92 in the jaw actuating wedge member 46. The function of the bolt 93 and washer 96 is to cause jaws 21 to be vertically reciprocated away from the reinforcing bar when the actuating wedges 46 are pulled from between the jaws and containment element 47. Jaw members 41 are confined for guided vertical movement as will be set forth hereinafter, but the sliding of washer element 96 along surface 92 will pull bolt 93 radially outwardly as wedge 46 is withdrawn from between the jaws and the containment member 47. When the wedges are urged in the opposite direction, the washer 96 merely rides down surface 92 toward the large end of actuating wedges 46.

The vertical reciprocation of jaws 21 is ensured by keying the jaws to casting members 49. This can be accomplished, for example, by providing vertically extending slots 101 in sides 102 of the wedge portion 41 of jaws 21. A pin 103 having an end 104 that protrudes into slot 101 and has flattened or milled sides 106 (FIG. 1) may be driven into an opening 107 in the castings in a manner similar to that of pin 86, which controls horizontal movement of wedge members 46. The pins 86 and 103 are frictionally held in the respective bores in the castings, but additionally washer 108 can be bolted by fastener 109 so as to extend over both of pins 103 and 86 (best seen in dotted lines in FIG. 2). Thus, the pins 103 extending into slots 101 in each side of the jaw element 41 will prevent longitudinal movement of the jaw elements and ensure guided vertical reciprocation in the direction of arrows 31.

A further feature of the present invention is that the chuck assembly is formed so that debris, chips, contaminants and the like do not extend to become jammed between the moving parts of the chuck assembly. Thus, the casting halves 49 are formed with an opening 126 between end wall 127 of containment element 47 and adapter plate 58. Opening 126 will enable chips and debris to gravitate or fall from the jaws and wedges outwardly of the chuck assembly. Additionally, maintenance of the chuck assembly, including removal of debris and replacement of worn parts, is made relatively easy by the use of two castings which are bolted together by fasteners 48. It is a relatively simple matter to unbolt the fasteners and replace parts, which are readily accessable.

It is a further important feature of the present invention to provide jaw means 21 as a structure in which a jaw engaging element 43 is removably mounted to the wedge portion 41 of the jaw means. The removable mounting of element 43 serves two functions. First, removable mounting of the jaw engaging element 43 enables ready replacement of the workpiece engaging element in the event that the same shall become worn or damaged during use.

Secondly, and more importantly, it is preferable for the jaw engaging element 43 to engage reinforcing bar member 23 at a point at which wedge members 46 are advanced between containment elements 47 and the jaw members 41 a substantial distance. Thus, full gripping forces are ideally generated in the chuck assembly of the present invention when the jaw actuating wedges 46 are supporting the jaws over virtually the entire length of surface 26. Full insertion of wedge members 46 between the containment and jaw members will ensure an even generation of gripping force over the full length of the jaws. Since it is desirable that the chuck of the present invention be suitable for use with reinforcing bars of various diameters, providing the jaw means with a removable reinforcing bar engaging element 43 enables the bars to be gripped at a point at which the actuating wedges 46 are almost fully inserted between the jaws and the containment members 47, regardless of the reinforcing bar diameter. Thus, element 43 can be removed from jaw member 41 and a new element 43 having a smaller height dimension height dimension H (FIG. 5) inserted so that the workpiece engaging element will accommodate a larger diameter reinforcing bar 23. The chuck assembly, therefore, preferably includes a plurality of workpiece engaging elements having height dimensions, H (and shoulder spacings) which enable gripping of bars of differing diameters at a maximum and uniform gripping force.

A particularly advantageous means of removably mounting members 43 to member 41 has been provided. The member 41 is provided with a longitudinally extending slot 111 in the bottom surface 112 thereof. Slot 111 terminates and a dove-tailed surface 113 approximate the small end of member 41. Bar engaging element 43 is provided with a protruding longitudinally extending rib 114 dimensioned for positioning in slot 111 and having dove-tailed surfaces 116 and 117 at the ends thereof. Formed in the end of jaw wedge portion 41 is a U-shaped recess 118 in which a locking member 119 may be positioned. Locking member 119 includes a protrusion 121 that mates with a recess formed by transversely extending bore 122 through jaw member 41. Mating with surface 116 is a dove-tailed surface 123 formed on the lower end of member 119. Locking member 119 is secured by fastener 124 to wedge member 41 so as to trap or lock bar engaging element 43 in slot 111 of jaw member 41.

Figure 5:
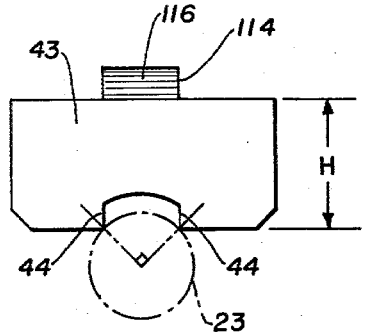
FIG. 5 is an enlarged, end elevational view of the removable workpiece engaging element of the chuck assembly of FIG. 2.
Figure 6:
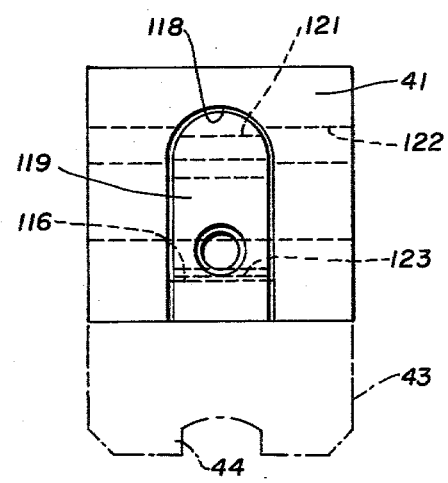
FIG. 6 is an enlarged, end elevational view, of the wedge of FIG. 4, with the jaw retaining element mounted thereto and the workpiece engaging element shown in phantom.

As best may be seen in FIG. 5, bar engaging element 43 includes shoulder portions 44 that are laterally spaced apart. The width of separation of shoulders 44 is preferably selected so that the shoulders engage reinforcing bar 23 at about 90° intervals around the reinforcing bar. Since there is preferably a top and bottom workpiece engaging element 43, each of which engage a bar at about 90° intervals, the bar will be engaged at four positions, each separated from the other by 90°. The width dimension between shoulders 44 will vary for each of the set of bar engaging elements 43 provided to enable gripping of bars of different diameters.

Additionally, the bar engaging element 43 is preferably formed of a material which is harder than reinforcing bar 23. Shoulders 44 are also preferably rather substantial in their cross section, for example, 90° shoulders, so that they can repeatedly deform or dig into the ribs on the outside of the reinforcing bar 23 without fatiguing or wearing away. The shoulders of the bar engaging elements, therefore, will dig into the ribs of the reinforcing bar at 90° intervals and provide a relatively narrow line contact with the bars over the length of the jaws so as to enable high resistance to torsional loading of the bar, as for example occurs when threads are milled on the bar end.

This jaw construction will enable gripping of reinforcing bars with enough force so as to straighten the bars, to penetrate and deform the bar ribs, and to rigidly hold bars of various diameters so that they may be threaded, milled or otherwise machined by the thread mill.

What is claimed is:

1. A chuck assembly for rigidly gripping an elongated reinforcing bar having a plurality of ribs or protrusions thereon to enable machining thereof by a machine tool or the like, said chuck assembly including a pair of jaw members each having a first side formed to engage said reinforcing bar and an oppositely facing second side formed with an elongated surface extending along said second side, said jaw members being mounted in equal, relatively spaced apart relation about a longitudinally extending central axis for receipt and gripping of said reinforcing bar therebetween, said jaw members each being further mounted to said assembly for reciprocation of the first sides thereof toward and away from said central axis; a pair of wedge members mounted to said assembly and each including an elongated jaw engaging surface mounted in sliding engagement with said second side of each of said jaw members; and containment means formed with load supporting surfaces slidably engaging sides of said wedge members facing away from said jaw members for support thereof, said wedge members each being mounted to said assembly intermediate said containment means and said jaw members and being movable in a direction along said central axis to urge said jaw members toward said central axis and generate lateral gripping forces between said jaw members, wherein the improvement in said chuck assembly comprises:

said first sides of said jaw members each being formed for line contact with said reinforcing bar along lines extending along said central axis;
said first sides being further formed with a length dimension equal to at least 4 times twice the distance from said first sides of said jaw members to said central axis when said first sides first engage said reinforcing bar; and
said jaw engaging surface on each of said wedge members and said load supporting surfaces on said containment means each extending axially along said central axis substantially coextensively with and over a distance at least substantially equal to the length of said first sides of said jaw members.

2. A chuck assembly as defined in claim 1 wherein, said wedge members and said jaw members are coupled together for relative sliding movement in a direction along said central axis by fastener elements carried by one of said wedge members and said jaw members and slidably engaging slot means in a remainder of said wedge members and said jaw members.

3. A chuck assembly as defined in claim 2 wherein, said jaw members are secured against displacement along said central axis and are free for displacement toward and away from said central axis by fastener means carried by one of said jaw members and said containment means and slot means formed in a remainder of said jaw members and said containment means.

4. A chuck assembly as defined in claim 1 wherein, said first sides of said jaw members are each formed with a length dimension in the range of about 5 to about 10 times twice the distance from said first sides to said central axis upon engagement of said first sides with said reinforcing bar.

5. A chuck assembly as defined in claim 1 wherein, said containment means is formed as a pair of casting halves releasably secured together and formed to define an opening therebetween positioned to permit gravitation of debris from the moving portions of said assembly to the exterior of said containment means.

6. A chuck assembly as defined in claim 1 wherein, said first sides of said jaw members are provided by reinforcing bar engaging elements,
said bar engaging elements each being removably mounted to said jaw members by cooperatively interengaging surfaces formed in said jaw members and said bar engaging elements and a locking member removably mounted to said jaw members, said locking member being formed to engage said bar engaging elements and to urge said cooperatively interengaging surfaces against each other to secure said bar engaging elements to said jaw members.

7. A chuck assembly as defined in claim 1 wherein, the first sides of said jaw members are each provided by a reinforcing bar engaging element removably mounted to said jaw members and formed of a material that is harder than said reinforcing bar, each said bar engaging element being formed with a pair of shoulders spaced apart from each other for line contact with said reinforcing bar at about 90° intervals around said bar to enable deformation of said ribs of said reinforcing bar along the lines of contact by said bar engaging element.

* * * * *